May 14, 1968      W. DE BACK      3,382,900
CONTOUR PEELER

Filed Oct. 4, 1965      11 Sheets-Sheet 1

INVENTOR.
William deBack
BY
Cameron, Kerkam & Sutton
ATTORNEYS

May 14, 1968    W. DE BACK    3,382,900
CONTOUR PEELER

Filed Oct. 4, 1965    11 Sheets-Sheet 6

Fig. 7    Fig. 8

INVENTOR.
William deBack
BY
Cameron, Kerkam & Sutton
ATTORNEYS

INVENTOR
William deBack

United States Patent Office 3,382,900
Patented May 14, 1968

3,382,900
CONTOUR PEELER
William de Back, Honolulu, Hawaii, assignor to Castle
 & Cooke, Inc., Honolulu, Hawaii, a corporation of
 Hawaii
Filed Oct. 4, 1965, Ser. No. 492,446
21 Claims. (Cl. 146—6)

ABSTRACT OF THE DISCLOSURE

Pineapples are contour peeled in two stages, a mill cut (shell) and a juice cut (flesh with eyes) by a dual head orbital peeler. The pineapple is held from rotation by four slitting knives as it is fed through the peeler heads, the blades of which are universally mounted. The heads are spring biased toward the pineapple and are centrifugally counterbalanced.

---

This invention relates to contour peelers for fruit and more particularly to such peelers for the preparation and peeling of pineapple.

More particularly still, this invention relates to contour peelers for pineapples in which the pineapples are first moved to position for trimming of the butt end, then moved to position for trimming of the crown end; then cored; and thereafter moved through revolving peeling heads which first peel the shell from the pineapple following the contour of the same and then remove a layer of pineapple meat containing the remaining traces of the eyes, again following the contour of the pineapple, the pineapples being moved continuously through the various stages of the operation.

Heretofore, and for at least the past forty years, pineapples have been prepared for slicing in the so-called "Ginaca" machine in a stepwise operation.

In the Ginaca the size graded pineapples are first fed through a centering device and then, crown end first, through a hollow cylindrical rotating sizing knife which cuts the shell and a considerable portion of the fruit adhering thereto from the pineapple. The resulting cylinder is then fed to a turret where the crown and butt ends are trimmed and, thereafter, the core is cut from the fruit cylinder. The shell goes to eradicator knives which strip a predetermined portion of the fruit from the shell, and the core and the eradicated fruit are available for further processing. The hollow cylinder of fruit thus formed then goes to workers who manually cut defects from the cylinder, grade it and the cylinder then goes to the slicing machine. All parings from the cylinder and rejected cylinders are then either discarded or sent to the juice presses. After slicing, the slices are graded manually and arranged for filling into cans, broken and imperfect slices being cut into segments for canning as such or crushed for canning as crushed pineapple. The manual operations required in the preparation of the fruit after the fruit cylinder is prepared by the "Ginaca" machine, increase the costs of the preparation and canning of pineapples and may be quite wasteful in that excessive amounts of fruit may go into the production of juice, or into mill by-products.

At the present time, crushed pineapple is a highly acceptable article of commerce and produces a higher return than pineapple juice or mill by-product. It is therefore desirable that the preparation of the pineapple produce a maximum amount of crushed pineapple and a minimum amount of discard for juice and mill by-products, while, at the same time, producing the maximum amount of fruit available as slices. The "Ginaca" machine does not completely meet these production requirements since the hollow cylindrical sizing knife cuts the same size of fruit cylinder from each pineapple regardless of the size thereof within its pregraded limits. In larger pineapples, therefore, proportionately more fruit is removed from the shell by the eradicator knives which fruit is commonly used only in the production of juice with consequent loss of production of crushed pineapple.

The disadvantages inherent in the "Ginaca" machine can be substantially overcome by contour peeling of the fruit in which a first peeling head follows the contour of the pineapple and removes only the outer shell of the pineapple with minimum removal of any other portion of the fruit, this cut producing what is called "the mill cut." Thereafter a second peeling head following the contour of the pineapple, removes a predetermined layer of fruit or flesh of the pineapple adjacent to the aforesaid "mill cut" and this cut, known as the "juice cut" is utilized in the making of pineapple juice. The resulting product is then a hollow cylinder of fruit, which when sized and sliced produces a maximum of acceptable fruit slices with a minimum amount of fruit going to juice and mill by-produces with more fruit available for the crush and solid pack.

During the contour peeling operations the fruit should be relatively stationary and the peeling heads should be revolved about the fruit to prevent mechanical damage and minimize loss of juices. Both the mill cut and the juice cut should be removed as spiral strip cuts from the periphery of the fruit and both cuts should be removed from the peeling heads and from the fruit as strip segments for maximum efficiency in the peeling operation. The fruit should therefore be removed past the revolving peeling heads in a timed relationship to obtain the desired width and depth of cut. It has been found that the best peeling is obtained if both the mill cut and the juice cut are approximately one-half inch in width and extend spirally around the circumference of the pineapple, the mill cut being of a depth just sufficient to remove the shell and the juice cut being of a depth just sufficient to remove the traces of the eyes.

The present invention overcomes the several disadvantages of the "Ginaca" machine by utilizing the principles and features discussed above resulting in a typical extraction comparison as follows:

|  | Percent deBack | Percent Ginaca |
| --- | --- | --- |
| Mill Cut | 30.6 | 41.0 |
| Juice Cut | 34.7 | 33.0 |
| Crush | 16.0 | 8.7 |
| Slices | 17.2 | 15.8 |
| Losses | 1.5 | 1.5 |
| Total | 100.00 | 100.00 |

It is therefore an object of the present invention to provide novel apparatus for the contour peeling of pineapples in which pineapples are continuously fed first to a centering and clamping device which transports the fruit to a butt end trimming knife; followed by a crown end trimming knife; then to a precorer, after which the fruit is then moved past revolving peeling heads for removing the mill cut and then the juice cut, the fruit being held against rotation during peeling and the peeling heads revolving about the fruit to remove a spiral mill cut and a spiral juice cut therefrom.

It is another object of the present invention to provide such apparatus in which the revolving peeling heads follow the contour of the fruit, the first peeling head removing only the shell of the fruit and the second peeling head removing a layer of the fruit containing the remainder of the eyes.

Another object of the present invention is to provide such apparatus in which the peeling heads for removing the mill cut and the juice cut have pivoted blades which conform to the contour of the fruit during the peeling operation and pivot automatically to take the proper pitch angle for a spiral cut.

A further object of the present invention is to provide such apparatus in which the peeling head blades are curved to substantially follow the contour of the pineapple and are offset on a pivot about an axis parallel to the vertical movement of the pineapple for proper peeling of the pineapple at its varying diameters.

Another object of the present invention is to provide such apparatus in which the peeling heads are mounted on a rotor, consisting of a disc, having suitable bearings and a driving means, and a central aperture through which the pineapple passes, with the peeling heads disposed diametrically opposite around the circumference of the aperture and vertically spaced from each other in the direction of movement of the pineapple whereby the peeling head closest to the disc removes the mill cut and the other peeling head spaced above removes the juice cut.

Another object is to provide such apparatus in which the peeling heads are pivoted on a rotary disc diametrically opposite on the circumference of the central aperture in the disc through which the pineapple passes, with resilient means urging the peeling head blades into engagement with the pineapple and with the peeling heads counter-weighted to reduce to a minimum the centrifugal force tending to move the peeling head blades away from the pineapple.

Another object is to provide such apparatus in which the pineapple is slit parallel to the axis thereof to a depth including the depth of the juice cut, with the slits being spaced about the circumference of the pineapple in a predetermined manner, prior to the pineapple reaching the revolving peeling heads.

Another object of the present invention is to provide such apparatus in which the peeling head equipped with peeling blades is so shaped and mounted that the bottom portion of the blade cuts the upper half of the width of the spiral cut and the upper portion of the blade cuts the lower half of the width of the spiral cut to sever the same from the body of the pineapple.

Another and still further object of the present invention is to provide such apparatus in which the pineapple is impaled on a precoring tube prior to its being peeled after which the precored spheroid of fruit is then engaged by means for removing the same from the apparatus.

Other and further objects of the present invention will appear from the following description of an illustrative embodiment thereof.

The contour peeler of the present invention is capable of various mechanical embodiments one of which is shown in the accompanying drawings and is described hereinafter to illustrate the invention. This illustrative embodiment should in no way be construed as defining or limiting the invention and reference should be had to the appended claims to determine the scope thereof.

In the accompanying drawings, in which like reference characters indicate like parts.

Figures 1, 10:
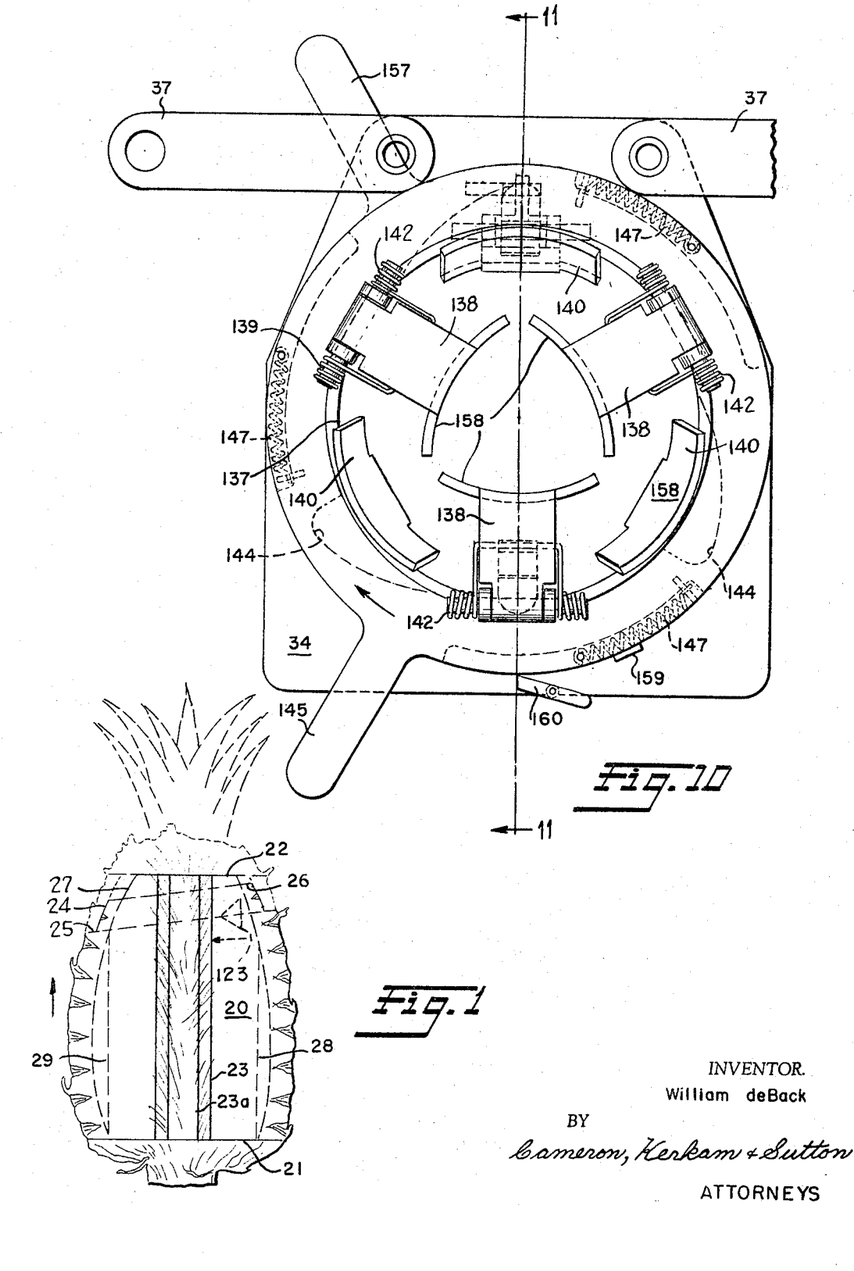
FIG. 1 is a schematic cross-sectional view of a representative pineapple showing the location of the butt and crown cuts, the precoring cut, the coring cut and the diagonal cuts of the contour peeling of the present concept as compared to the sizing cut of a Ginaca machine.
FIG. 10 is a view from above of a centering head, fifteen of these heads being employed in the apparatus of FIG. 2.

Referring now to FIG. 1, a pineapple is there shown generally at 20 in sectional elevation. In the apparatus of the present concept the butt end is first trimmed along the line 21 and the crown end is then trimmed along line 22. A precoring tube then impales the fruit and while still impaled, the fruit is raised through the revolving peeling head rotor, one peeling head removing the mill cut along the contour line 24 by removing a spiral paring along the dotted line 25, and the second peeling head removing the juice cut to the depth of the contour line 27 also making a spiral cut along the dotted line 26. Line 28 represents the surface of the fruit cylinder as sized by a conventional Ginaca machine so that the area designated by numeral 29 indicates the amount of fruit saved by the present apparatus as available for further processing as canned product.

Figure 2:
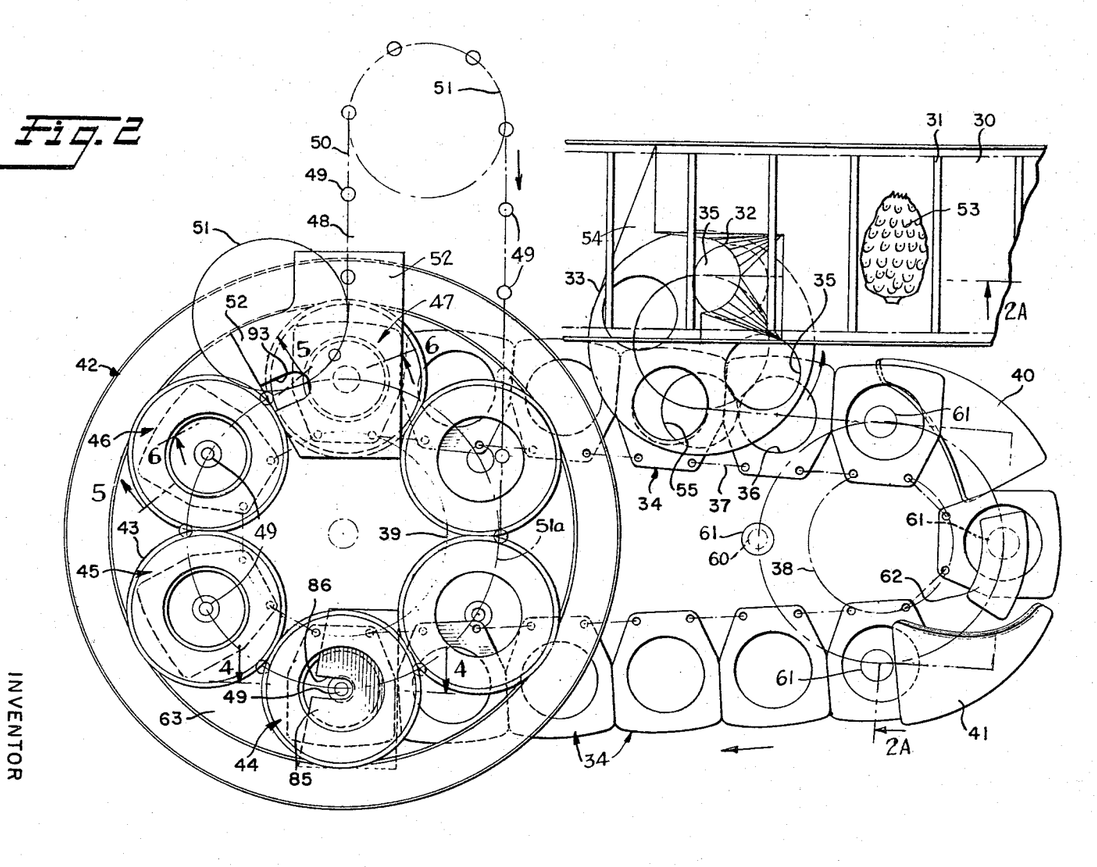
FIG. 2 is a schematic view from above of apparatus in accordance with the present invention showing the relative location of the several parts thereof and the cooperation between the centering devices and the peeling heads together with the conveyors for bringing pineapples to the apparatus and for removing the finished fruit product therefrom.

The apparatus of FIG. 2 includes a conventional conveyor 30 having bars 31 thereon for bringing pineapples one at a time to a chute 32, chute 32 feeding the pineapples butt first into a rotary distributor 33 which rotates in timed sequence with an underlying series of moving centering heads 34 so that each pineapple in pockets 35 of distributor 33 will drop by gravity into a pocket 36 in a centering head 34. Centering heads 34 move in a suitable track or frame not showing in FIG. 2 and are connected by links 37 to pass around sprocket 38 and around drive sprocket 39 in endless chain. Butt end knife 40 attached to the main frame is disposed adjacent sprocket 38 so that the butt ends of the pineapples in centering heads 34 will be trimmed at this position. Crown end knife 41 is also attached to the main frame also disposed adjacent sprocket 38 so that the crown ends of the pineapples in the centering heads 34 will be trimmed at this position. After trimming of the crown ends by knife 41, the pineapples in the centering heads 34 move beneath rotary frame or turret 42 which is mounted for rotation on the axis of sprocket 39 to bring each of the six peeling head rotors 43 in turn, over and in timed relation with centering heads as indicated at stations 44 to 47. At station 44 the precoring operation is performed as will be explained in more detail hereinafter. Further rotation of frame 42 releases a pineapple from its centering head and the pineapple is moved through the contour peeling heads at the stations indicated at 45 and 46. Thereafter the peeled pineapple is removed from the apparatus and the core discharged at station 47. A conveyor generally indicated at 48 and comprising a plurality of downwardly extending spindles 49 suitably mounted on track 50 passes around sprockets 51 and 51(a) above turret 42 so that each spindle 49 in turn comes to position above a precoring tube at station 44 as will be explained in more detail hereinafter. The peeled pineapple mounted on spindle 49 is moved over slideway 52 for discharge as will appear more fully hereinafter in connection with FIG. 8.

Figure 2A:
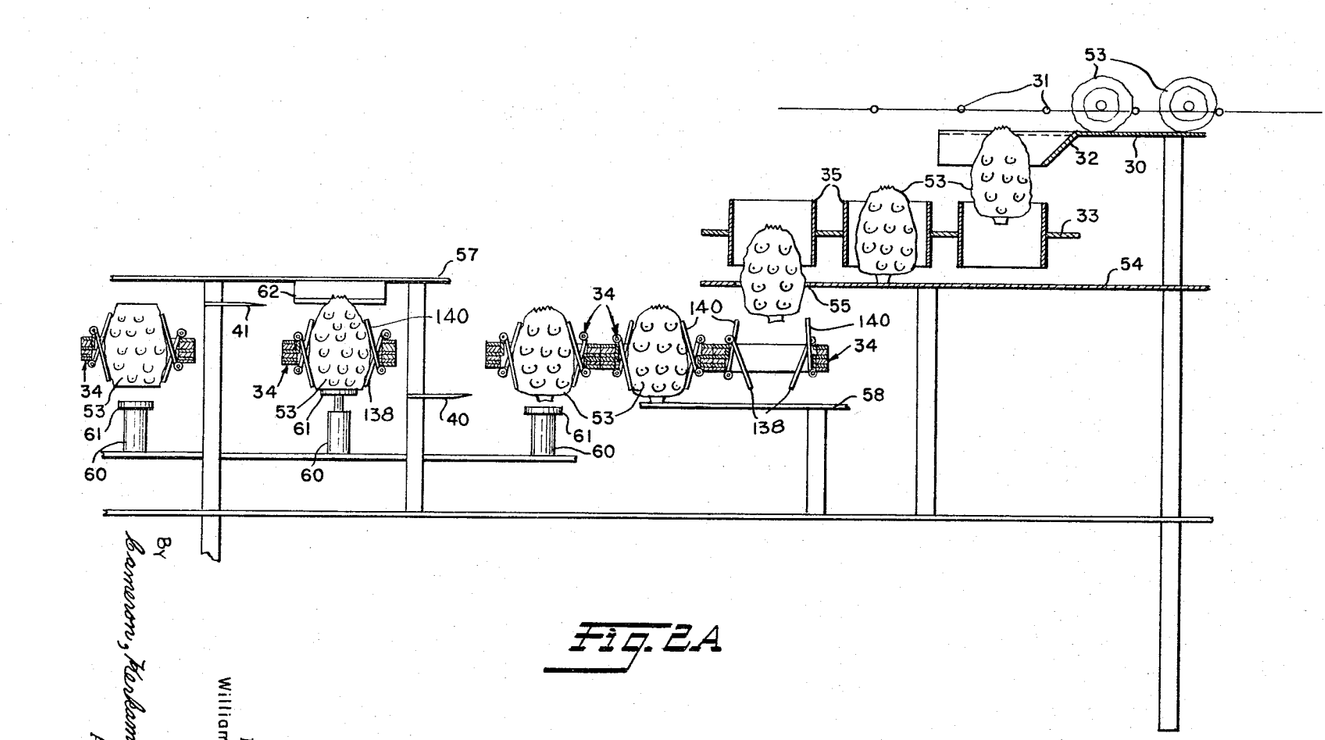
FIG. 2A is a vertical section of a portion of the apparatus taken on 2A—2A of FIG. 2.
Figure 11:
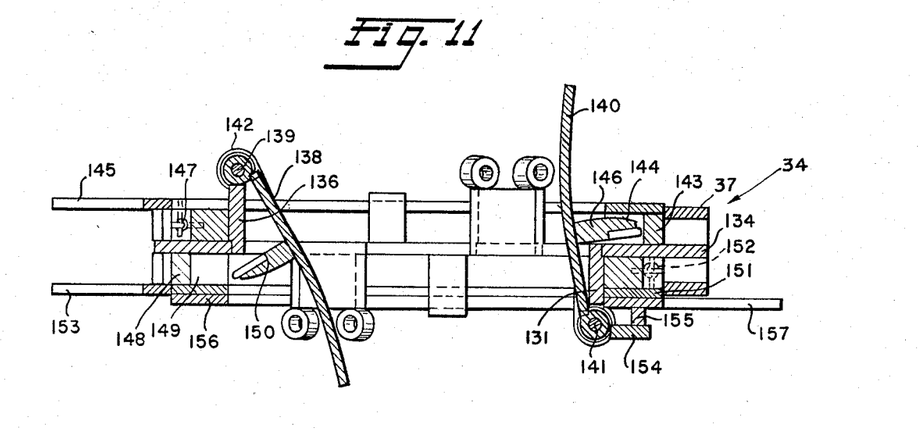
FIG. 11 is a cross-sectional view of the centering head of FIG. 10 on the line 11—11 thereof.
Figure 12:
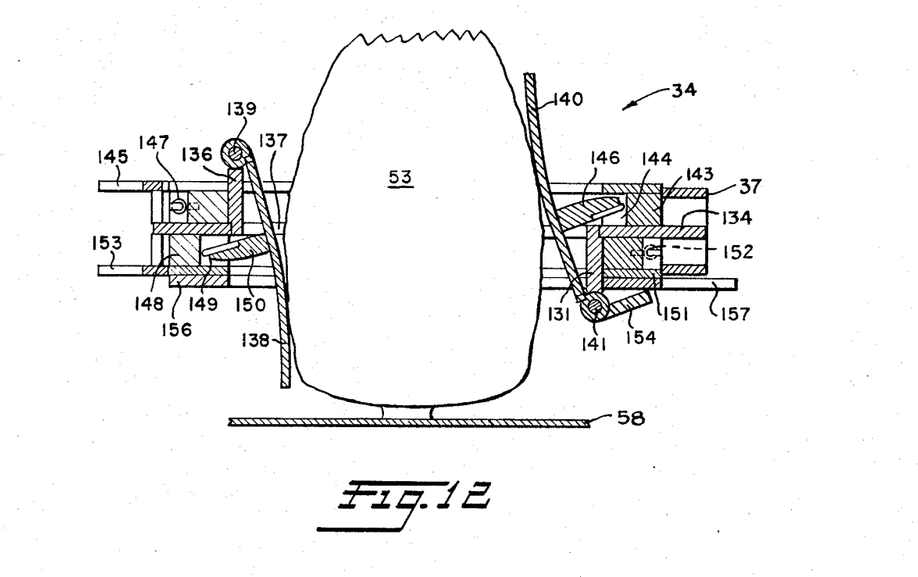
FIG. 12 is a view similar to that of FIG. 11 showing a centering head gripping a pineapple therein.

Referring now to FIGS. 2 and 2A, a pineapple indicated at 53 is shown on conveyor 30 approaching chute 32 which guides pineapple 53 butt end first into a pocket 35 of distributor 33. A plate 54 beneath distributor 33 is provided to support the fruit 53 until it reaches position 55 at which point it drops butt end first into a centering head 34 moving in timed relation with distributor 33. As noted above, a plurality of centering heads 34 are mounted for movement in suitable tracks which are carried by the main frame of the apparatus. When the pineapple first enters a centering head 34 through aperture 55, the butt end of the pineapple engages a gauge plate 58 mounted on the main frame. At this point centering fingers generally indicated at 138 and 140 in FIGS. 10, 11 and 12 are actuated, as will be later described in detail, to center and hold the pineapple securely in the centering head. The centering head with the pineapple securely centered and held therein moves from beneath aperture 55 to bring the pineapple into contact with butt trimming knife 40 secured to main frame and the butt end is trimmed from the pineapple along the line 21 of FIG. 1 with the separated butt end being discharged for such further processing as may be desired.

Thereafter, the pineapple with the butt end trimmed and clamped in its centering head 34, is registered over vertical cylinder 60 and piston 61 carried by sprocket 38 (FIGS. 2 and 2A). Cylinder 60 is suitably actuated to raise piston 61 after the pineapple has cleared the butt trimming knife 40. At this point fingers 138 and 140 are partially released so that piston 61 raises pineapple 53 to engage the crown thereof with a gauge plate 62 mounted on frame 57. Thereafter, fingers 138 and 140 are again moved into firm and gripping engagement with pineapple 53 and piston 61 is withdrawn. Further movement of the centering head 34 with the pineapple 53 firmly held and centered therein brings the pineapple past crown end knife 41 which trims the crown end of the pineapple along the line 22 of FIG. 1, the trimmed crown end then being discharged from the apparatus for such further processing thereof as may be desired.

Butt end and crown end trimming knives 40 and 41 have been shown as fixed knives but it is obvious that they may be rotary knives or knives of any other suitable construction actuated when the pineapple is brought to position for trimming the butt or crown ends therefrom.

Figure 3:
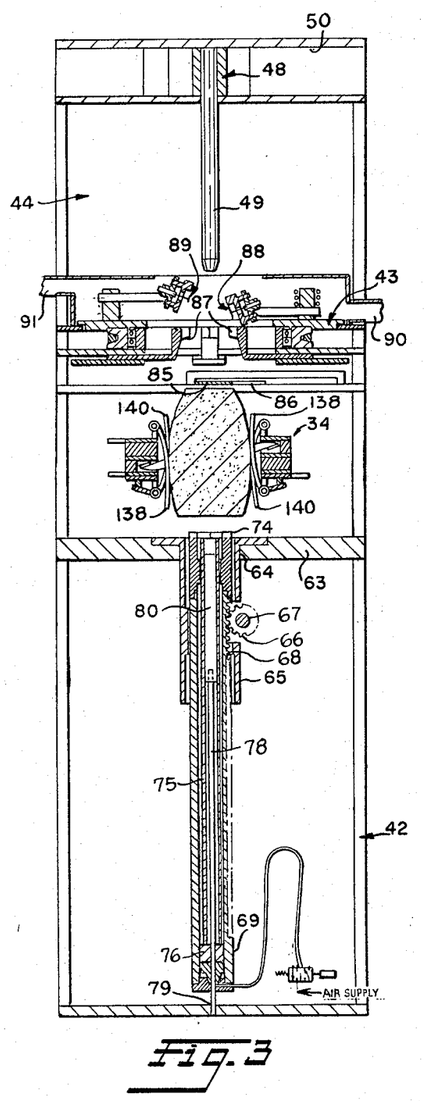
FIG. 3 is a vertical section of a portion of the apparatus of FIG. 2 showing the position of a centering head (shown diagrammatically) and a pineapple therein prior to the precoring operation.

After the crown end has been trimmed, pineapple 53 clamped in its centering head 34 next travels toward rotary turret 42, and registers over cylinders 69 containing coring tube 75, carried by said rotary turret 42 as shown in FIG. 3.

Figure 9:
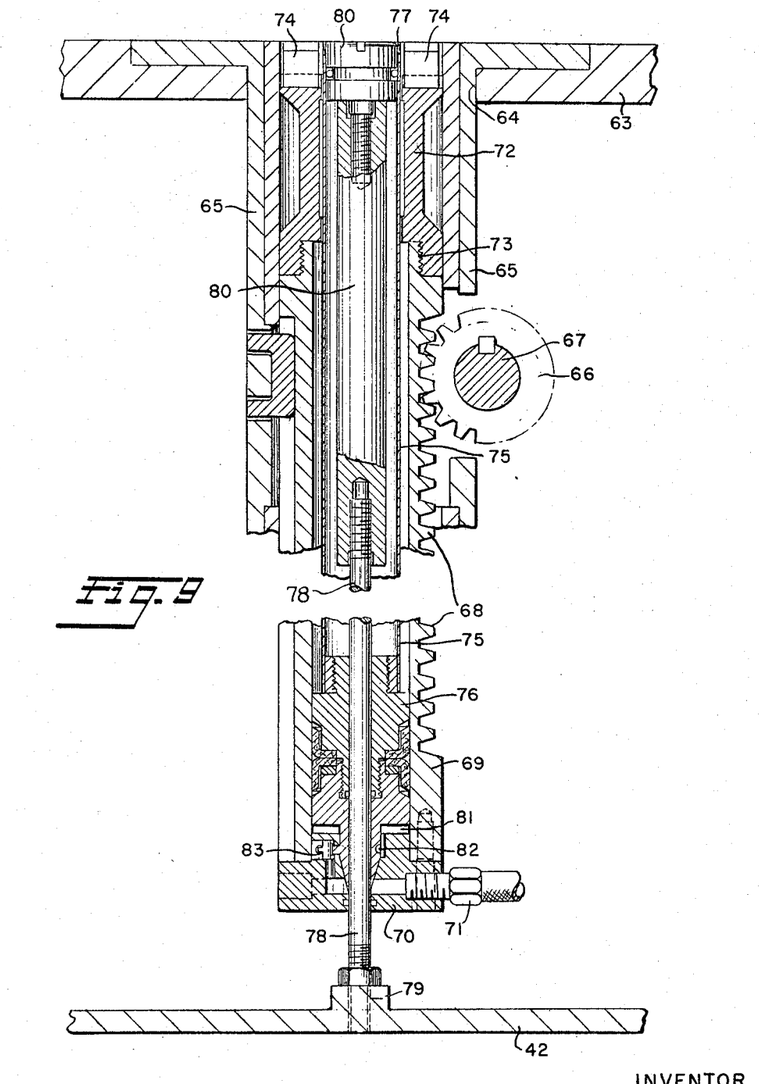
FIG. 9 is an enlarged detail of a portion of the apparatus of FIG. 3 showing the construction of the precorer and the plunger for moving a pineapple through the rotor with its peeling heads.

FIG. 3 shows a pineapple 53 with butt and crown ends trimmed securely held and centered in its centering head 34 just prior to the precoring operation with spindle 49 approaching alignment with a coring tube 75 (FIG. 9). It will be apparent that the pineapple 53 is also centered under peeling head rotor 43. Turret 42 is provided with a circular plate 63 apertured at 64 to receive sleeve 65 as seen in enlarged detail in FIG. 9. A spur gear 66 mounted on shaft 67 is rotated at an appropriate time in the cycle of operation as will appear more fully hereinafter. Gear 66 engages teeth 68 on cylinder 69 with its cylinder head 70 suitably secured thereto. The upper end of cylinder 69 is provided with sleeve 72 mounted thereon by threads 73. Sleeve 72 terminates in spaced impaling blades 74 which engage the butt end of a pineapple and aid in preventing rotation of the pineapple during the peeling operation. A hollow cylindrical coring tube 75 is mounted within cylinder 69 and is carried on a suitable piston head 76. Coring tube 75 is provided with an upper circular cutting edge 77. A rod 78 is rigidly mounted at 79 on frame 42 and passes through head 70 and piston head 76 with a sliding fluid-tight fit and terminates in an enlarged section 80 which strips the core from the coring tube while it is being withdrawn.

Figure 4:
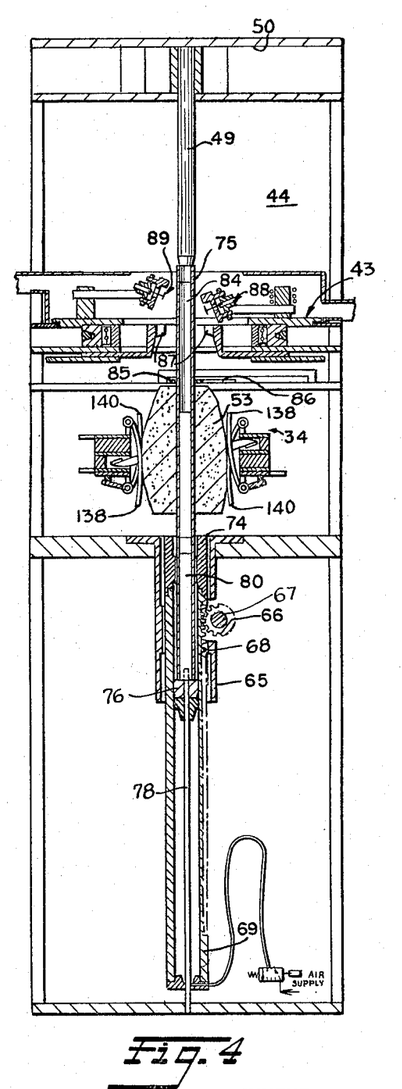
FIG. 4 is a view similar to FIG. 3 on line 4—4 of FIG. 2 showing the position of the several parts of the apparatus adjacent a peeling head after precoring of a pineapple in the centering head.

Air under pressure is admitted at an appropriate time in the cycle of operation, beneath piston head 76 in cylinder 69 through fitting 71 and passes beneath head 76 in space 81 and through passages 82 to pressure actuated latch 83 which is mounted in cylinder 69. When latch 83 is released, air under pressure acting on piston head 76 raises coring tube 75 and forces the same upward through the center of a pineapple gripped in a centering head 34 and further restrained from upward movement by slotted plate 85, to precore the pineapple along the line 23a of FIG. 1 and as seen in FIG. 4 the core being generally indicated at 84. Coring tube 75 now rises and engages conveyor spindle 49. At this time the top of piston head 76 is in engagement with the bottom shoulder of the enlarged section 80 of rod 78 and upward movement of coring tube 75 is arrested. Before the precoring operation pineapple 53 has been moved beneath a fixed plate 85 attached to the main frame and provided with a slot 86 (FIG. 2) to prevent the pineapple from rising in centering head 34 while coring tube 75 passes therethrough, slot 86 permitting the coring tube 75 to pass through plate 85 and to move with the rotation of turret 42.

It will be noted that the pineapple remains impaled under coring tube 75 during the peeling thereof.

Figure 5:
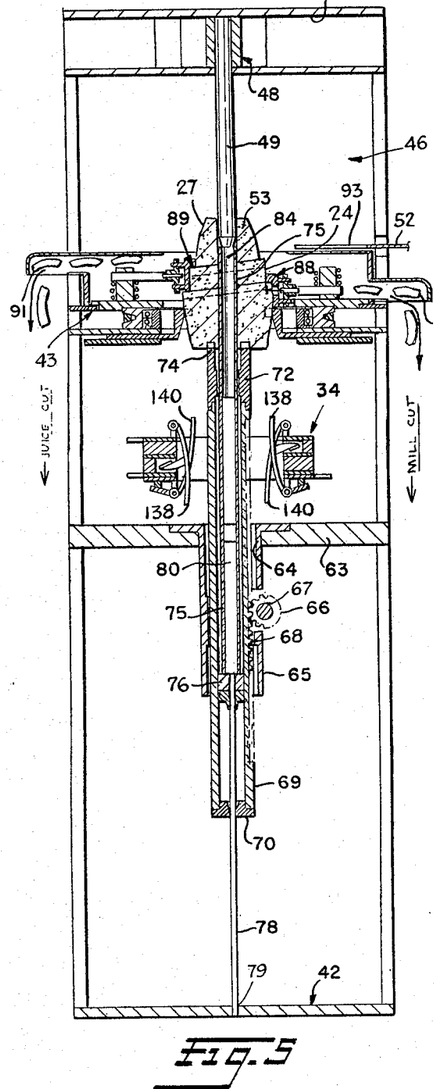
FIG. 5 is a view similar to FIG. 4 on line 5—5 of FIG. 2 of a pineapple passing through a peeling head having been released from its centering head.

Spur gear 66 is now rotated by suitable means not shown and cylinder 69 is raised to force impaling blades 74 into the butt end of pineapple 53. Centering fingers 138 and 140 are now withdrawn and further upper movement of cylinder 69 raises pineapple 53 out of its centering head 34 and engages vertical slitting blades 87 which also assist in preventing rotation of the pineapple 53 during the peeling operation, after which the pineapple 53 passes through mill cut peeling head 88 and juice cut peeling head 89 to be hereinafter described in detail. Peeling heads 88 and 89 revolve about pineapple 53 performing spiral cuts thereon as seen in FIG. 5 the mill cut being discharged from peeling head 88 at 90 and the juice cut being discharged from peeling heads 89 and 91.

Figure 6:
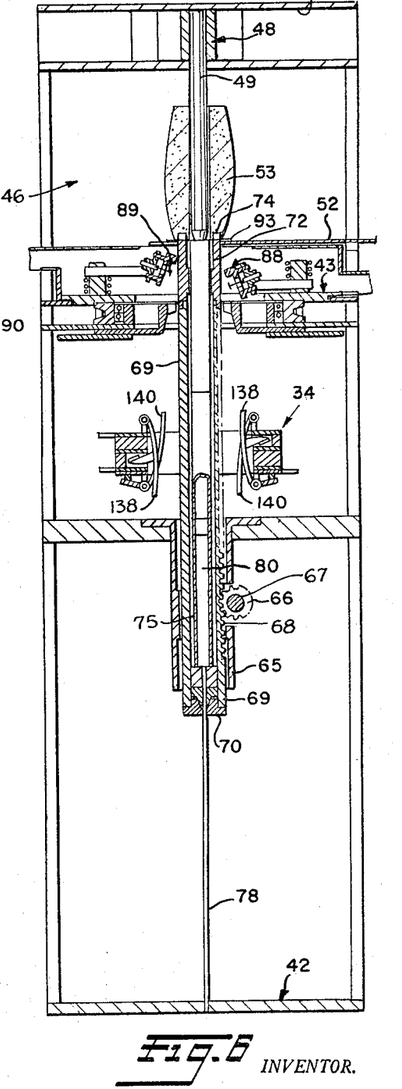
FIG. 6 is a view similar to FIG. 5 on line 6—6 of FIG. 2 showing a pineapple after it has passed through a peeling head and is engaged by a conveyor for removing the same from the apparatus.
Figures 7, 8:
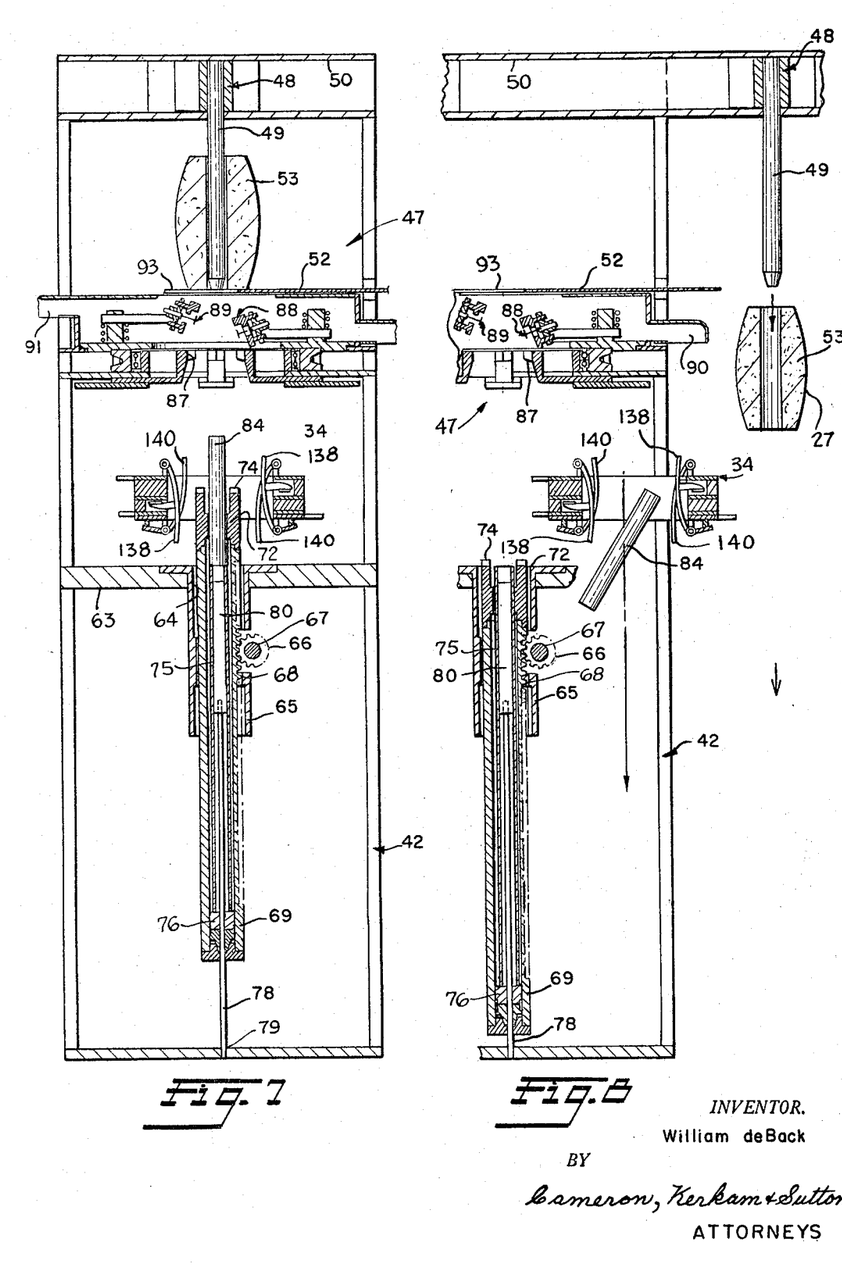
FIG. 7 is a view similar to FIG. 6 showing the position of the parts of the apparatus with a peeled pineapple being moved to discharge position.
FIG. 8 is a view similar to FIG. 7 showing the position of the parts upon discharge of a peeled pineapple from the apparatus with discharge of a core from the precoring tube.

Continued upward movement of piston 69 strips pineapple 53 off of coring tube 75 and onto spindle 49 aligned therewith. At this time, and as seen in FIG. 6, pineapple 53 is shifted over plate 52 (FIG. 2) provided with notch 93 to receive the upper end of cylinder 69, to support pineapple 53. Latch 83 carried by cylinder head 70 now reengages piston 76 to lock coring tube 75 and cylinder 69 together. Spur gear 66 is now reversed and impaling blades 74 are withdrawn from pineapple 53, as seen in FIG. 7, plate 52 supporting the pineapple during its subsequent movement in the apparatus. Further downward movement of cylinder 69 and coring tube 75 brings core 84 into engagement with enlarged portion 80 of rod 78 and core 84 is stripped out of coring tube 75 and moved by the adjacent centering head 34 to position for gravity discharge out of the apparatus as seen in FIG. 8. In the meantime, pineapple 53 has been moved off of plate 52 (FIG. 2) by its spindle 49 and discharges by gravity to any suitable conveyor for further processing as may be desired.

Figure 13:
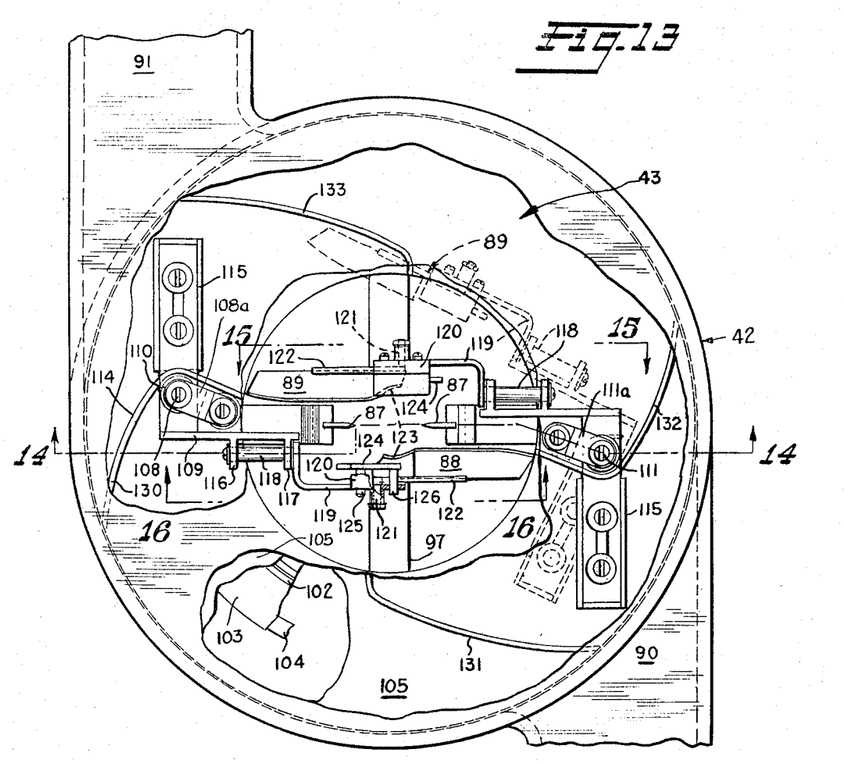
FIG. 13 is a view from above of a peeling rotor assembly, six such assemblies being employed in the apparatus of FIG. 2.
Figure 14:
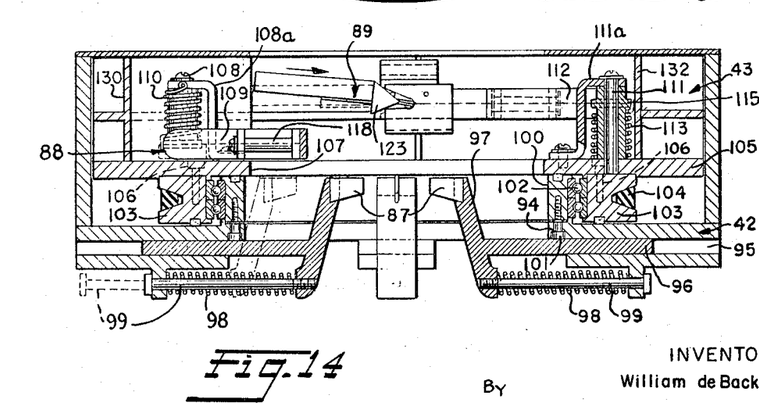
FIG. 14 is a cross-sectional elevation on the line 14—14 of FIG. 13.

A peeling head 43 is shown in detail in FIGS. 13 and 14 and the knives used therewith are shown in detail in FIGS. 15, 16 and 17A and 17B. Particularly with reference to FIGS. 13 and 14, the peeling rotor 43 is mounted for orbital motion on turret 42, the latter being provided with a circular aperture 94 (FIG. 14) beneath each peeling head rotor 43. Four guideways 95 are provided beneath aperture 94 and are spaced at 90° thereabout, each receiving a slide 96. Slitting blade holder 97 is mounted on slide 96 and supports vertical slitting blade 87 and extends through aperture 94 and is angularly disposed with respect to the axis thereof. Each slide 96 and blade holder 97 is resiliently urged toward the axis of aperture 94 by a spring 98 mounted about guide rod 99 which is connected at one end to turret 42 and at the other end to blade holder 97. Each slitting blade 87 is therefore resiliently urged toward the center of aperture 94.

A pineapple 53 moving upwardly on cylinder 69 therefore first engages the inclined surfaces provided by blade holders 97 and moves them outwardly against the action of springs 98. Blades 97 then engage pineapple 53 and slit the same longitudinally, blades 87 being of such depth as to slit the pineapple to the depth desired for the juice cut, as described heretofore. The resilient action of springs 98 causes blades 87 to follow the contour of the pineapple so that the pineapple is uniformly slit to the desired depth and this also assists in preventing rotation of the pineapple 53 during the peeling operation.

A ring 100 is disposed about the outer edge of aperture 94 and is suitably secured to turret 42 by bolts 101. Bearings 102 are mounted about the outside of ring 100 and a drive pulley 103 is mounted on bearings 102 for rotation about ring 100. A belt 104 drives pulley 103 from suitable motor means not shown.

A rotor base plate 105 is mounted for rotation on pulley 103 as by bolts 106 and is provided with a central circular aperature 107 disposed above aperture 94 through which a slit pineapple 53 passes to the peeling heads.

A peeling head axial (relative to the pineapple axis) pivot 108 is mounted adjacent aperture 107 and is stabilized by bracket 108a, and an arm 109 is mounted for rotation thereon adjacent the upper surface of plate 105, a suitable coil spring 110 urging arm 109 toward the center of opening 107. Arm 109 supports mill cut peeling blade 123 as will be described in more detail hereinafter.

A second peeling head pivot 111, stabilized by bracket 111a, is mounted on plate 105 adjacent aperture 107 and diametrically opposite pivot 108. Pivot 111 carries arm 112 for rotation thereon and arm 112 is resiliently urged toward the center of aperture 107 by coil spring 113. Arm 112 supports juice cut peeling blade 123 as will be described more fully hereinafter. It will be noted that arm 109 is located adjacent the upper surface of plate 105 while arm 112 is vertically spaced above plate 105 to afford an axial separation of peeling heads 88 and 89 of approximately 1 inch so that the spiral mill cut is removed prior to the spiral juice cut.

Mill cut peeling head 88 and juice cut peeling head 89 are of identical construction and will therefore be described particularly with reference to mill cut peeling head 88. As seen in FIG. 13, arm 109 is offset from pivot 108 and is mounted on a lever arm 114 which in turn is mounted on pivot 108. An adjustable counterweight 115 is mounted on lever arm 114 away from arm 109 to counter the effects of centrifugal force on the structure of peeling head 88 when rotor 105 is rotated at the desired speed of approximately 400 r.p.m. The action of the spring 110 is superimposed upon this centrifugal balancing action in order to urge the knife assembly radially inward against the pineapple, thereby providing contour peeling. The counterweight 115 is made adjustable in order to provide optimum cutting action. Spaced brackets 116 and 117 are secured to arm 109 and receive a tangential (relative to the pineapple) pivot 118 (FIG. 18) which is disposed horizontally to plate 105 and at right angles to pivot 108. A second arm 119 is mounted on a tangential pivot 118 for rotation at right angles to the axis of pivot 108. Arm 119 carries a shoe 120 which engages the freshly cut contour 24 of the pineapple (FIG. 17B) to orient the blade 123 about the tangential pivot 118 so that the blade follows the pineapple contour. A radial (relative to the pineapple) pivot 121 passes through arm 119 at right angles both to the axis of pivot 118 and to the axis of pivot 108. The blade holder 122, an extension of pivot 121, is pivotally mounted for movement on arm 119 in a boss 119a and supports triangular blade 123. An adjustable plate 124 is mounted on arm 119 and its position with respect to peeling blade 123 is adjusted by set screws 125 and 126. The position of plate 124 with respect to the triangular section of blade 123 determines the depth of cut made by said section as will be apparent from FIGS. 17A and 17B. The depth gauge plate 124 and the shoe 120 cooperate to cause the face of blade 123 to follow the contour of the pineapple, as previously mentioned.

Figures 15, 16, 17A, 17B:
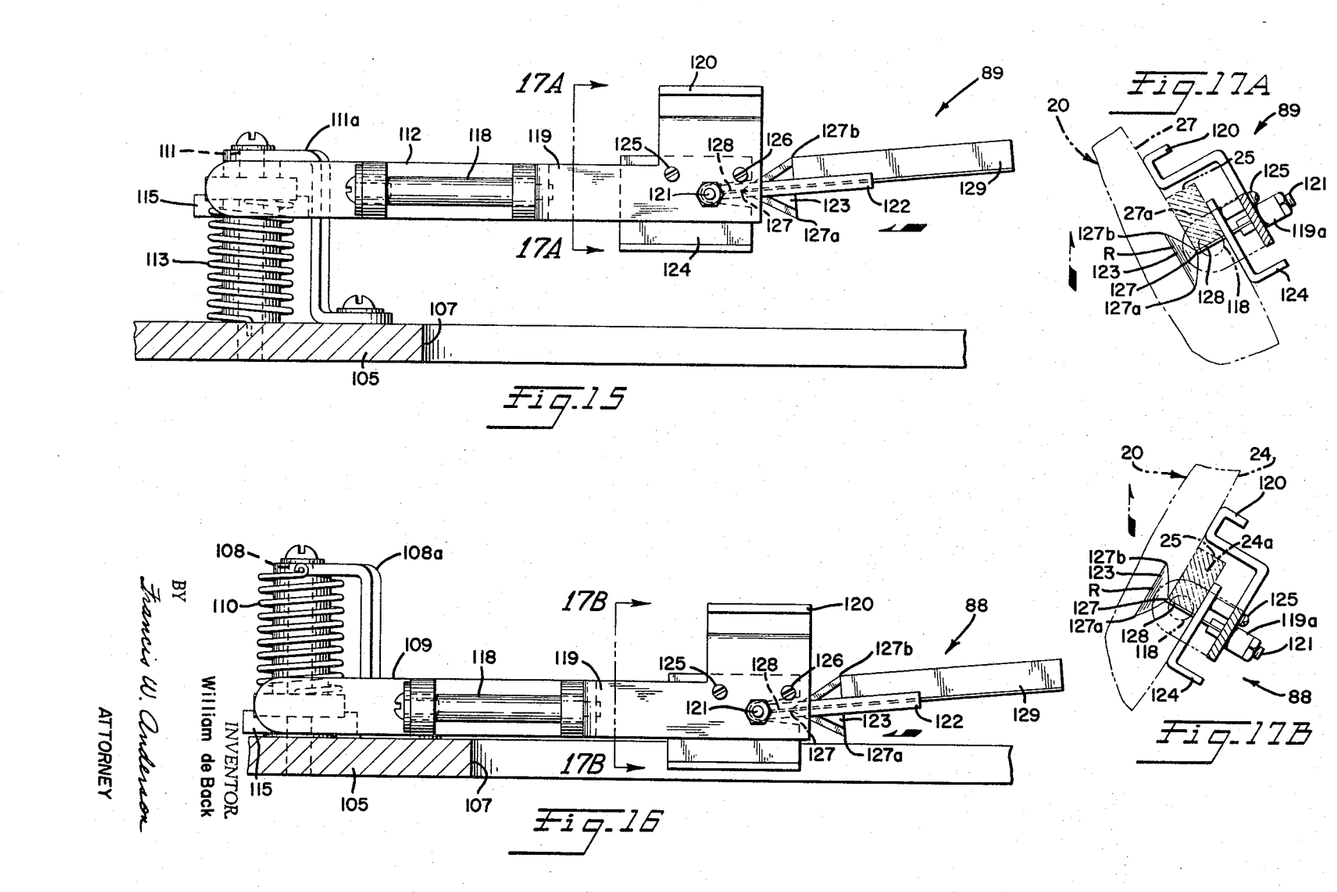
FIG. 15 is an enlarged partial detail of the support structure for the upper or juice cut blade of the peeling head of FIG. 13.
FIG. 16 is an enlarged detail of the lower or mill cut blade of the peeling head of FIG. 13.
FIG. 17A is a section taken on line 17A—17A of FIG. 15 looking toward the point of a juice cut peeling blade in position for contour peeling at the crown end of a pineapple with the line pivot broken away.
FIG. 17B is a section taken on line 17B—17B of FIG. 16 similar to that of FIG. 17A showing a mill cut peeling blade in position for contour peeling at the butt end of a pineapple.
Figure 18:
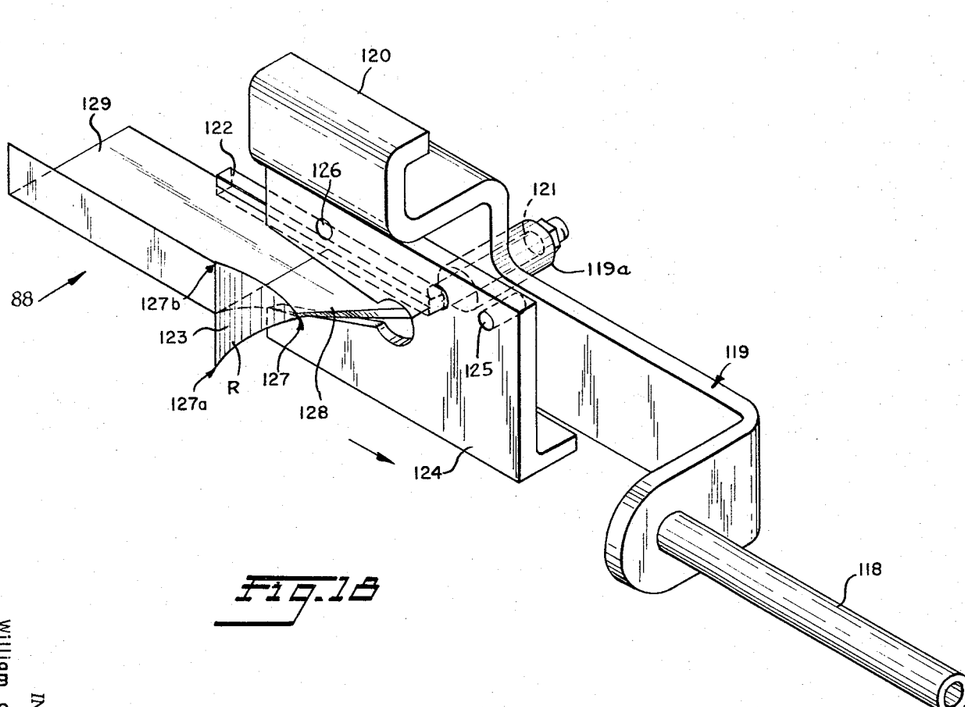
FIG. 18 is an enlarged perspective view of a peeling knife and its mounting structure.

The mill cut peeling head generally indicated at 88 (FIG. 13) comprises a triangularly shaped blade section 123 including an apex point 127 and base angles 127a and 127b (FIG. 18) with an extended horizontal (radial) peel slicing blade section 128 fixed to blade holder 122. The base angle 127a of triangular blade section 123, gauged by plate 124, first enters the pineapple to a predetermined depth as the latter moves upward through the peeling head 88. As seen in FIGS. 17A, 17B and 18, triangular knife section 123 is curved on a radius R similar to that of the cut surface of the pineapple to assist coil spring 110 to maintain a proper depth of cut by peeling blade 123 as controlled by gauge 124. Triangular blade 123 is spaced from holder 122 by horizontal blade section 128 which is sharpened from the apex point 127 of the blade 123 to pivot 121 to provide a spiral cut with radial blade 128 cutting along the line 25 (FIGS. 1 and 17B). Blade sections 123 and 128 are extended by a guide plate 129 to bridge the opening of aperture 107 to lead the parings from the pineapple to discharge. Since peeling head 88 is mounted for relatively free rotation about pivot 121, it automatically takes the angularity (FIG. 15) required for a spiral cut during the peeling operation dependent upon the speed of rotation of plate 105 and the separate vertical movement of the pineapple past the peeling heads. For the juice cut, the radial blade 128 on the head 89 makes a spiral cut along the line 26 (FIGS. 1 and 17A).

Suitable baffles 130, 131, 132 and 133 are mounted on plate 105 to guide the parings from peeling heads 88 and 89 to appropriate discharge points 90 and 91 (FIG. 13).

Triangular knife section 123 has a curvature R having a radius suitable for pineapples from 3 to 6 inches in diameter. This curvature together with the offset between pivot 108 and arm 109, described above, permits knife assembly 123 to follow the contour of the pineapple regardless of size, shape or diameter thereof.

The universal mounting of triangular blade section 123 permits it to follow the curvature of the pineapple from crown end to butt end as well as providing the helix angle (FIG. 15), and a uniform depth of cut is provided by the resilient action of springs 110 and 113 together with the bevelled cutting edges of blades 123 which are urged inwardly and controlled by gauge plate 124.

It will be seen from FIG. 14 that an upwardly moving pineapple approaching peeling heads 88 and 89 is first engaged by base angle 127a of blade 123 followed by blade 128, with the base angle 127a cutting to one-half the width of the vertical spiral cut. On the next revolution of the rotor base plate 105, the base angle 127b of blade 123 completes the vertical portion of the spiral cut from beneath, and the pared sections 24a between the slits provided by slitting blades 87 (FIG. 14) and above the spiral cut 25 (FIG. 1) made by the horizontal blade 128, are removed over guide plate 129 to discharge from the rotor. A similar action occurs at the juice cut head 89, and pared sections 27a are removed along the vertical contour line 27 and above the horizontal spiral cut 26 made by the horizontal blade 128 on the head 89 (FIGS. 1 and 17A).

As noted above, rotor 105 is rotated at about 400 r.p.m. The correlated speed of vertical movement of the pineapple through rotor 105, past the peeling heads produces a spiral cut, having a predetermined width.

Centering heads 34 with their associated centering fingers 138–140 have been discussed above and the actuation of the centering fingers at appropriate times in the cycle of the apparatus has been described. A suitable and specific construction for a centering head 34 (FIGS. 10–12) comprises a central plate 134 having three equally spaced downwardly depending arms 138 and three equally spaced upwardly extending arms 140, arms 140 being located circumferentially between arms 138 and extending through a central aperture 137 in plate 134 to receive the pineapple 53.

Downwardly extending fingers 138 are mounted on pivots 139 carried by arms 136. Upwardly extending fingers 140 are mounted on pivots 141 carried by a downwardly extended arm 131. Springs 142 on pivots 139 urge fingers 138 inwardly toward the center of opening 137. A cam ring 143 bearing cam surfaces 144 is mounted for rotation on the plate 134 and is actuated by cam ring and arm 145. Cam surfaces 144 cooperate with cam followers 146 secured to fingers 140 to move fingers 140 into engagement with pineapple 53. Springs 147 provide a resilient connection between cam ring 143 and its operating ring 145.

A second cam ring 148 provided with cam surfaces 149, is mounted for rotation beneath plate 134. Cam surfaces 149 cooperate with cam followers 150 which are mounted on fingers 138 to urge fingers 138 into engagement with pineapple 53. Cam rings 148 are provided with an actuating disc 151 and a resilient connection is provided between ring 148 and disc 151 by springs 152, disc 147 being rotated by arm 153.

Positive opening of fingers 140 is provided by providing each finger 140 with an inturned cam follower 154 which is engaged by a cam surface 155 on cam plate 156 which is mounted for rotation beneath disc 151. Cam plate 156 is rotated by arm 157, FIG. 12. As will be seen in FIG. 11, fingers 140 are positively opened prior to the dropping of a pineapple 53 into the centering head 34 and the weight of the pineapple entering the centering head 34 will move fingers 138 against the action of their springs 142 to center the base of the pineapple initially in the centering head. Thereafter bottom disc 156 is rotated to free extensions 154 from cams 155. Top disc 145 is then rotated to cause cam 143 to engage cam surfaces 144 with cam followers 146 to positively move fingers 140 into engagement with the top of pineapple 53. At the same time plate 151 is rotated to cause cam ring 148 to bring cam surfaces 149 into engagement with cam followers 150 to positively move fingers 138 into engagement with the butt end of pineapple 53. Pineapple 53 is therefore centered and clamped in the centering head 34.

As seen in FIG. 10, fingers 138 and 140 may be provided with arcuate extensions 158 if desired, for more securely clamping the pineapple. A stop 159 may be provided on ring 145 for engagement by pivot latch 160 which is mounted on plate 134 to hold ring 143 in position camming fingers 140 into engagement with the pineapple, latch 160 being tripped when it is desired to release fingers 140.

It should now be apparent to those skilled in the art that the present invention in every way satisfies the several objectives discussed above.

Changes in and modifications to the above-described illustrative embodiment of the present invention may now be suggested without departing from the inventive concept. Reference should therefore be had to the appended claims to determine the scope of this invention.

What is claimed is:

1. A contour peeler for pineapples comprising a centering head, means for feeding a pineapple to said head, means for centering, gripping and clamping the pineapple in said head, means for continuously moving said head in a predetermined path, a butt end knife adjacent the path of movement of said head trimming the butt end of the pineapple, a crown end knife adjacent the path of movement of said head trimming the crown end of the pineapple, a coring tube, means for forcing said tube through the pineapple, means for releasing said centering gripping and clamping means, a first peeling head comprising a universally mounted peeling blade revolving about the pineapple impaled by said coring tube for removing the shell of the pineapple, means to restrain the pineapple from rotation during the removing of the shell of the pineapple, a second peeling head comprising a universally mounted peeling blade revolving about the pineapple impaled by said coring tube spaced from said first peeling blade removing a layer of fruit containing all traces of the eyes, means for causing said peeling blades to follow the contour of the pineapple, means for supporting the pineapple after the pineapple is peeled, means for withdrawing said coring tube from the pineapple and means for removing the peeled pineapple from the contour peeler.

2. A peeler as described in claim 1, said centering head comprising a plurality of downwardly depending fingers for gripping the pineapple adjacent the butt end, a plurality of upwardly extending fingers for gripping the pineapple adjacent the crown end, first means for forcing and locking said downwardly depending fingers into engagement with the pineapple, second means for forcing said upwardly extending fingers into engagement with the pineapple, third means for moving said upwardly extending fingers away from the pineapple, resilient means urging said downwardly depending fingers toward the pineapple and means for actuating said first, second and third means in predetermined sequence.

3. A peeler as described in claim 2, said centering head including a plate, a central aperture in said plate, said fingers extending through said aperture, said means comprising cam rings mounted for rotation about said aperture and cam followers on said fingers engaging the adjacent cam ring.

4. A peeler as described in claim 3 including resilient couplings between said cam rings for engaging said fingers with the pineapple and said means for actuating said cam rings.

5. A peeler as described in claim 4, said means for actuating said cam rings comprising a rotary disc adjacent each of said cam rings, said resilient couplings extending between each of said cam rings and the associated one of said discs.

6. A peeler as described in claim 1 including a gauge plate beneath said centering head for receiving the butt of the pineapple prior to centering and gripping the pineapple in said head, a second gauge plate above said head, and means for moving the crown end of the pineapple into engagement with said second gauge plate after trimming of the butt end to determine the depth of trim of the crown end.

7. A peeler as described in claim 1, said coring tube being a hollow cylinder, said means for forcing said coring tube through the pineapple comprising a cylinder about and concentric with said coring tube, a piston head in said cylinder supporting said coring tube, means for admitting fluid under pressure of said cylinder beneath said piston head to unlock and raise said piston head, impaling blades on the upper open end of said cylinder, means for moving said cylinder to engage said impaling blades in the butt end of the pineapple and move the pineapple on said coring tube past said first and second peeling heads and means for locking said piston head to said cylinder released by admission of fluid under pressure to said cylinder.

8. A peeler as described in claim 7, including a fixed rod centrally disposed in said coring tube and extending through said piston head and through said cylinder to force the pineapple core from said coring tube.

9. A peeler as described in claim 7 including a plurality of spaced downwardly extending spindles, means for moving said spindles continuously into alignment with and above said coring tube, said cylinder moving the pineapple off of said coring tube and onto said spindle after the pineapple has past said first and second peeling heads.

10. A peeler as described in claim 9 including a plate receiving the butt end of the pineapple which is being transferred to the discharge position on one of said spindles.

11. A peeler as described in claim 7, said means for moving said cylinder including a rack extending longitudinally thereon, a gear engaging said rack and a shaft for rotating said gear, and means for driving said shaft.

12. A peeler as described in claim 1 including a circular plate, a central circular opening in said plate, means for rotating said plate, a first pivot on said plate adjacent said opening mounting said first peeling head, a second pivot on said plate adjacent said opening diametrically opposed to said first pivot for mounting said second peeling head, said contouring means comprising spring means urging said first and second peeling heads toward said opening and a counterweight for each of said first and second peeling heads counteracting centrifugal forces acting thereon.

13. A peeler as described in claim 12 including a plurality of fixed guides beneath said circular plate adjacent to and spaced about said opening, a slide in each of said guides, an arm on said slide, a slitting blade on said arm adjacent said opening and resilient means urging said slitting blade toward the center of said opening.

14. A peeler as described in claim 13, said slitting blade being disposed in a plane including the axis of rotation of said circular plate and slitting the pineapple parallel to the long axis thereof to a predetermined depth of cut.

15. A peeler as described in claim 12, each of said first and second peeling heads including an arm mounted on the adjacent one of said pivots on said circular plate, a pivot on said arm extending at right angles to said pivot mounting said arm, a second arm mounted on said last named pivot, a third pivot on said second arm extending at right angles to said two last named pivots, a blade holder mounted on said third pivot for free movement thereon, a radial knife blade in said holder extending parallel to said circular plate when at rest and extending toward said opening and triangular blade section, a part of said triangular blade section of said knife extending equally at an angle of approximately 90° on opposite sides of said radial knife blade, the leading point of said triangular blade section being on the axis of said third pivot.

16. A peeler as described in claim 15 including a depth plate mounted between said second arm and said triangular blade section and means for adjustably spacing said depth plate with respect to said triangular blade section.

17. A peeler as described in claim 15, said triangular blade section having a curved surface adjacent said opening and having diverging cutting edges.

18. A peeler as described in claim 1 including a plurality of said centering heads, means for moving said centering heads continuously in an endless path, a continuously rotating frame over a part of said endless path, a plurality of coring tubes, mounted on said frame for rotation into cooperative relationship with succeeding moving centering heads, said first and said second peeling heads being mounted in said frame above each of said coring tubes and a plurality of spaced downwardly extending spindles continuously moving in timed relation with rotating frame, aligned with and above said coring tubes and receiving the pineapple after peeling by said first and said second peeling heads.

19. A contour peeler for pineapple comprising a centering head, means for feeding a pineapple to said head, means for centering, gripping and clamping the pineapple in said head, means for continuously moving said head in a predetermined path, a butt end knife adjacent the path of movement of said head trimming the butt end of the pineapple, a crown end knife adjacent the path of movement of said head trimming the crown end of the pineapple, a coring tube, means for forcing said tube through the pineapple, means for releasing said centering gripping and clamping means, a first universally mounted peeling head revolving about the pineapple impaled on said coring tube, removing the shell of the pineapple, a second universally mounted peeling head revolving about the pineapple impaled on said coring tube, vertically spaced from said first peeling head, removing a layer of fruit containing traces of eyes, means for regulating the depth of cut of said peeling blades, said blades following the contour of the pineapple, means for supporting the pineapple after it is peeled, means for withdrawing said coring tube from the pineapple, means for discharging the core from said coring tube, means for separately discharging the mill cut and juice cut materials, and means for removing the peeled pineapple from the contour peeler.

20. A peeler for pineapple including a plate, a central aperture in said plate, means for rotating said plate, a first pivot on said plate adjacent said aperture, a first peeling head mounted on said pivot, a second pivot on said plate adjacent said aperture diametrically opposed to said first pivot, a second peeling head mounted on said second pivot, spring means urging said peeling head blades toward said aperture, a counterweight for each of said heads counteracting centrifugal forces acting thereon, each of said peeling heads including an arm mounted on the adjacent one of said pivots, a pivot on said arm extending at right angles to said pivot mounting said arm, a second arm mounted on said last named pivot, a third pivot on said second arm, extending at right angles to said two pivots, a peeling head blade holder mounted on said third pivot, a horizontal blade in said holder extending parallel to said plate when at rest and extending toward said opening and a triangular blade section mounted on the edge of said horizontal blade, a point of said triangular blade section extending adjacent to the axis of said third pivot and said triangular blade section extending equally on each side of said horizontal blade.

21. A pineapple peeler for making a spiral contour mill cut followed by a spiral contour juice cut; said peeler comprising frame structure, a core tube, means for centering a pineapple on said core tube, means for advancing said core tube with a pineapple thereon along a path in said frame structure which path is coaxial with the core tube axis, orbital mill cut and juice cut contour peeling heads spaced axially along said peeling path for successively removing the pineapple shell and a layer of flesh containing the eyes, means for rotating said heads and means for restraining the pineapple against rotation during peeling; said peeling heads each comprising a pivot parallel to said peeling path and offset from said path, a first arm on said pivot, said arm projecting tangentially to a pineapple on said core tube, spring means for pivoting said first arm toward a pineapple on said core tube, a second arm pivotally mounted on said first arm about a pivot axis that is tangential to a pineapple on said core tube, a third arm pivotally mounted on said second arm about a pivot axis that is radial to a pineapple on said core tube, a V-shaped knife on said third arm, the face of said knife being generally parallel to the peeling path with its cutting edges pointed tangentially of a pineapple on said core tube, a peel slicing blade projecting radially outward from the point of said V-shaped knife, a depth gauge plate on the side of said peel slicing blade from which the pineapple approaches, and a blade orienting shoe on the opposite side of said peel slicing blade.

References Cited
UNITED STATES PATENTS

| | | | |
|---|---|---|---|
| 1,137,841 | 5/1915 | Cookson | 146—6 |
| 1,590,162 | 6/1926 | Hargreaves | 146—6 |
| 1,984,709 | 12/1934 | Taylor | 146—6 |
| 2,034,160 | 3/1936 | Taylor | 146—6 X |
| 3,036,920 | 5/1962 | Farmer | 146—6 X |

W. GRAYDON ABERCROMBIE, *Primary Examiner.*